United States Patent [19]

Taira

[11] Patent Number: 5,034,756
[45] Date of Patent: Jul. 23, 1991

[54] LIGHT IRRADIATION DEVICE HAVING FILTER UNIT

[75] Inventor: Hiroshi Taira, Ichinomiya, Japan

[73] Assignee: Brother Kogyo Kabushiki Kaisha, Aichi, Japan

[21] Appl. No.: 597,343

[22] Filed: Oct. 15, 1990

[30] Foreign Application Priority Data

Oct. 30, 1989 [JP] Japan .................................. 1-282099
Nov. 20, 1989 [JP] Japan .................................. 1-301391

[51] Int. Cl.$^5$ ...................... G03B 27/54; G03B 27/73; G01D 15/14
[52] U.S. Cl. .................................. 346/107 R; 355/32; 355/71
[58] Field of Search .................... 358/300, 302, 75, 76; 346/107 R, 108, 110 R, 153.1, 160, 157; 355/202, 326, 327, 32, 71, 74, 84, 88

[56] References Cited

U.S. PATENT DOCUMENTS

4,135,927  1/1979  Draugelis .......................... 355/327
4,884,082  11/1989  Sonoda .
4,949,185  8/1990  Nakai .

Primary Examiner—Benjamin R. Fuller
Assistant Examiner—Scott A. Rogers
Attorney, Agent, or Firm—Oliff & Berridge

[57] ABSTRACT

A light irradiation device having a light source and a plurality of filters for providing a plurality of kinds of colored lights onto an object. The light irradiation device includes a carriage reciprocally movable over the object in one and opposite directions and carrying thereon the light source. The irradiation device also includes a filter frame mounted on the carriage and slidably movable in the one and opposite direction relative to the carriage. The slide frame is attached with the plurality of filters arranged side by side in a horizontal plane. The relative position between the carriage and the filter frame is controllable for changing a filter with remaining one of the filters.

7 Claims, 7 Drawing Sheets

LIGHT IRRADIATION DEVICE HAVING FILTER UNIT

BACKGROUND OF THE INVENTION

The present invention relates to a light irradiation device or an exposure device, and more particularly, to an improvement on the light irradiation device having a filter unit which includes red, green and blue filters selectively switchable for forming a latent image corresponding to the selected color image on a photosensitive image recording medium.

Figure 1:
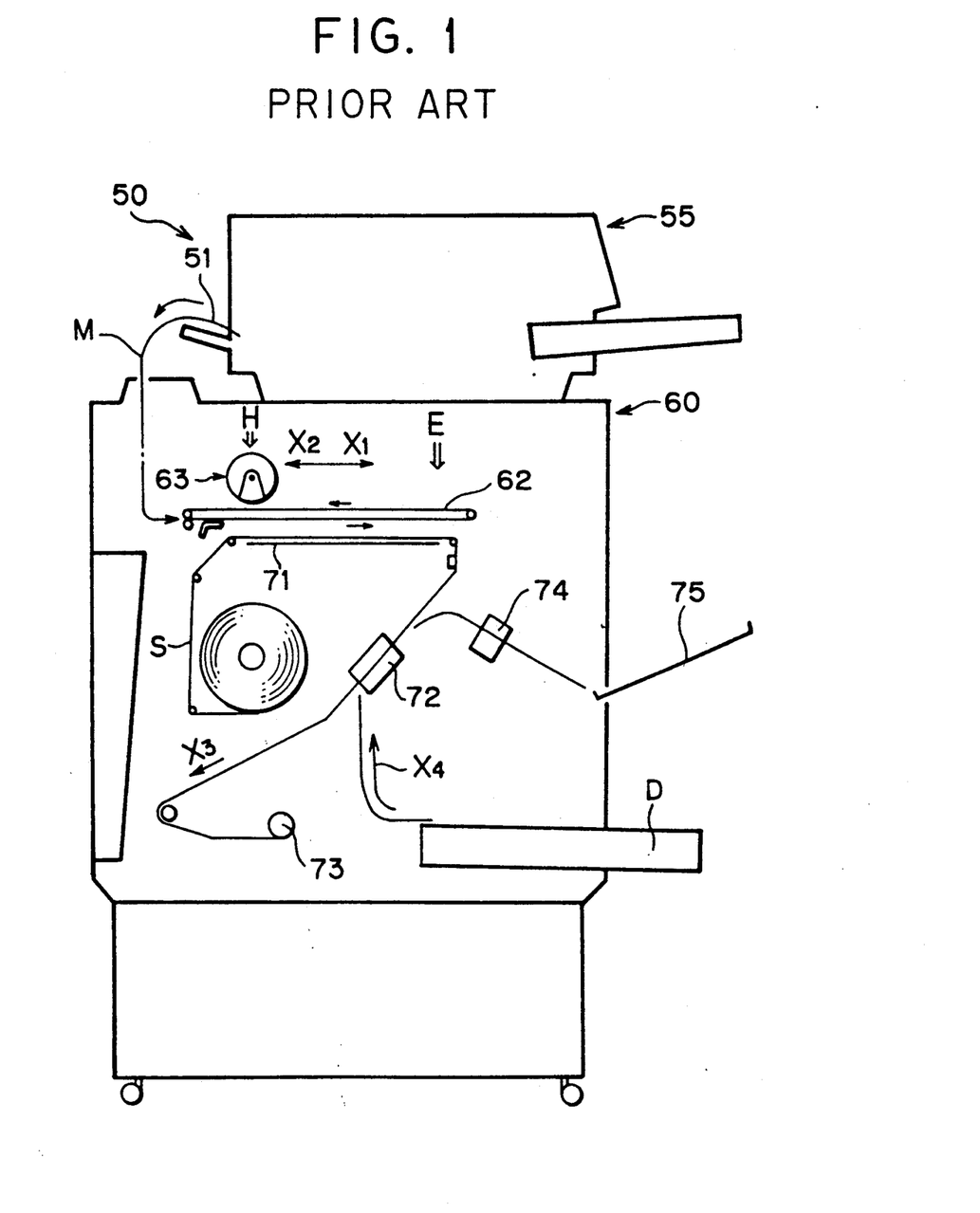
FIG. 1 is a schematic view showing one example of a conventional image recording apparatus.

One example of a conventional image recording apparatus is shown in FIG. 1. The image recording apparatus 50 includes a monochromatic laser printer 55 and a color copying machine 60 coupled to the printer 55. The laser printer 55 generally includes a polygon scanner, a chargeable photosensitive drum, developer unit, and a fixing unit etc. The polygon scanner forms an electrostatic latent image on the photosensitive drum, the image corresponding to an image of an original or an image of a specific color. A toner image is formed on the latent image zone on the drum, and the toner image is transferred onto a plain paper or an overhead projector sheet at the developer unit, and the transferred image is fixed at the fixing unit. The sheet carrying the output image is simply discharged. Alternatively, the image carrying sheet is delivered to the color copying machine 60 by way of a delivery path 51. In the latter case, the laser printer 55 produces mask members M which independently carry a red image, green image and blue image.

The color copying machine 60 has an upper inner portion in which a mask carrying unit having an endless belt 62 is provided. The endless belt 62 is circularly driven in a direction indicated by arrows in FIG. 1 on which the mask member M is electrostatically attracted. The endless belt 62 is formed of a transparent and dielectric material such as PET. The mask member M is subjected to positional alignment with an elongated image recording medium S passing through an exposure stand 71.

Figure 2:
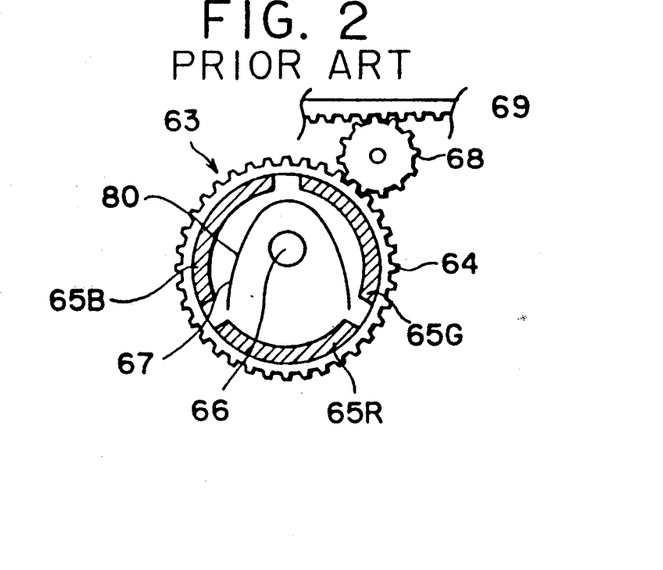
FIG. 2 is a cross-sectional view showing a conventional arrangement of a light source and filters.

At a position above the endless belt 62, a light irradiation device 63 is provided which is movable between a home position H and an end position E in directions indicated by arrows X1 and X2. As shown in FIG. 2, the light irradiation device 63 has a hollow cylindrical rotary body 64 to which a red filter 65R, a green filter 65G and a blue filter 65B are fixed at equi-angular spacing. A light source 80 having a white light lamp 66 and parabolic reflector 67 is positioned inside the filters. The rotary body 64 has an outer peripheral surface formed with a gears (not shown) engageable with a pinion 68. Further, a rack 69 driven by a drive source (not shown) is meshedly engaged with the pinion 68. Therefore, in accordance with the movement of the rack 69, the rotary body 64 is rotated about its axis through the pinion 68 and the gear. Therefore, one of the red, green and blue filters can be positioned in confrontation with the light source 80. As a result, a specific one of the red, green and blue lights is emitted onto the endless belt 62. The light irradiation device is disclosed, for example, in a Japanese Patent Publication No. 57-57692.

Turning back to FIG. 1, the image recording medium such as a microcapsule sheet S is adapted to pass through a space defined between the transparent endless belt 62 and the exposure stand 71 in a direction X3, and is wound over a takeup roller 73 by way of a pressure developing unit 72. The microcapsule sheet S is coated with microcapsules encapsulating therein photocurable resins and coloring agents of cyan, magenta and yellow photo-curable upon irradiation of red light, green light and blue light, respectively to restrain the color generation. For the exposure operation, the exposure stand 71 has an ascent position to bring into intimate contact with the mask member M carried on the endless belt 62. Therefore, a latent image is formed on the microcapsule sheet S. Another image recording medium such as a cut developer sheet D can be fed to the pressure developing unit 72 in a direction X4, where the developer sheet D is superposed with the latent image section of the microcapsule sheet S and these sheets are pressed together. Accordingly, a visible image is formed on the developer sheet D. Further, thermal fixing unit 74 is provided for fixing the visible image, and a discharge tray 75 is provided to receive the developer sheet D.

For the exposure operation, the printer 55 produces a first mask member MR on which a red color information of one original image is contained. The first or red mask member MR is fed to the endless belt 62 of the mask carrying unit, and is attracted thereto. The mask member MR is subjected to position adjustment to be set at a proper exposure position.

Then, the exposure stand 71 is elevated so that the mask member MR and the microcapsule sheet S are in intimate contact with each other between the exposure stand 71 and the endless belt 62. Thereafter, the light irradiating device 63 is moved in the X1 direction from its home position H to the end position E for the light scan during which red light is irradiated through the red filter 65R onto the microcapsule sheet through the red mask member MR. After the light scanning, the light irradiation device 63 is moved back to the home position H in the direction X2. During this return travel, the rotary member 64 is angularly rotated by a predetermined angle by the rack 69 and the pinion 68, so that the green filter 65G is positioned in confrontation with the light source 80, while the mask member MR is discharged to a mask receiving section (not shown). The same is true with respect to the light irradiations through the green filter 65G and the blue filter 65B, so that latent images are formed at three times on an identical portion of the microcapsule sheet.

Thus, an intended color latent image is formed on the microcapsule sheet S. Then, the exposure stand 71 is moved to its descent position, and the microcapsule sheet S is moved in the X3 direction. In synchronization with the movement of the microcapsule sheet S, the developer sheet D is fed in the direction X4 and the pressure developing operation is performed at the pressure developing unit 72. After the pressure developing operation, the microcapsule sheet S is wound over the takeup means 73 whereas the developer sheet D is fed to the fixing unit 74 and is discharged on to the discharge tray 75.

As described above, the filter change is made by the rotation of the rotary body 64 through the driving engagements of the rack 69, the pinion 68 and the gear of the rotary body. Here, the exact angular rotation amount may be slightly changed due to backlash or irregular meshing engagement between the rack 69 and the pinion 68. Accordingly, precise positional registration of the red, green and blue filters 65R, 65G, 65B may not be attained. In this connection, a filter position detection means is provided for detecting the angular position of the filter, and feed back control is made for the precise position registration with respect to the light source. As a result, overall cost may be increased.

Further, as shown in FIG. 2, in the conventional light irradiation device 63 having the tubular filter member and the light source positioned within the tubular member, a temperature within the tubular member may be excessively elevated, if the light source if of a heat releasable type such as a halogen lamp. To avoid this drawback, a cooling duct may be connected to the interior space of the tubular filter member for feeding cooling air thereinto so as to cool the color resolution filters.

Still however, if a power source is inadvertently shut off, the cooling air supply to the interior of the tubular filter member is stopped. In such a situation, the temperature within the tubular filter member cannot be promptly lowered, since the light source, the filter tube, and the reflector accumulate the heat therein. Due to the nonsupply of the cooling air, the temperature of the tubular filter member becomes elevated, and the inherent color resolution function of the filters may be degraded by the heat.

SUMMARY OF THE INVENTION

It is therefore, an object of the present invention to overcome the above described drawbacks, and to provide an improved light irradiation device capable of providing a precise position of each of filters relative to a light source.

Another object of the invention is to provide an improved light irradiation device in which excessive heating of the color resolution filters is avoidable even if electrical power supply is shut-off.

These and other objects of the invention will be attained by providing a light irradiation device having a light source and a plurality of filters for providing a plurality of kinds of colored lights onto an object, comprising a carriage reciprocally movable over the object in one and opposite directions, the carriage stationarily having the light source mounted there on, the carriage being provided with a carriage plate having a leading end and a trailing end, a slide frame mounted on the carriage plate and slidably movable in the one and opposite directions relative to the carriage plate, the slide frame being attached with the plurality of filters arranged side by side in a horizontal plane and having a leading end and a trailing end, a positioning means for positioning the position of the slide frame relative to the carriage plate, a first set of stop means abuttable on the leading end and trailing end of the slide frame for restricting the movement of the slide frame in the one and opposite directions, a second set of stop means abuttable on the leading and trailing ends of the carriage plate for restricting the movement of the carriage plate in the one and opposite direction, and drive means connected to the carriage plate for moving the carriage plate in the one and opposite directions. Positions of the first and second set of stop means being different from each other for changing the positional relationship between the carriage plate and the slide frame, whereby a selected one of the filters is positioned in confrontation with the light source.

The carriage is movable between its home position and end position during which light irradiation is carried out. If the slide frame passes through the end position, the slide frame abuts one of the first set of the stop means. In this case, the carriage is further moved until it abuts on the one of the second set of stop means. Accordingly, the position of the slide frame relative to the carriage is changed, and the changed position is held by the positioning means. In case of the return travel of the carriage, the carriage passes through the home position, and the slide frame abuts on the other stop means of the first set. However, the carriage is further moved until it abuts on the other stop means of the second set. As a result, the position of the slide frame relative to the carriage is further changed. By controlling the "further" moving length of the carriage, the filters can be changed with a remaining one of the filters at the position in confrontation with the light source.

In another aspect of the invention, there is provided a light irradiation device having a light source and a plurality of filters for providing a plurality of kinds of colored lights onto an object, comprising; a carriage reciprocally movable over the object in one and opposite directions, the carriage having the light source stationarily mounted thereon, a slide frame mounted on the carriage and slidably movable in the one and opposite direction relative to the carriage, the slide frame being attached with the plurality of filters arranged side by side in a horizontal plane, filter position changing means connected to the slide frame for changing one of the filters with remaining one of the filters to a position in confrontation with the light source, the changing means being electrically actuatable, drive means connected to the carriage for moving the carriage in the one and opposite directions, and biasing means connected to the slide frame for mechanically urging the slide frame in a direction so as to move the filters to a position remote from the light source when the electrical power supply to the filter position changing means is shut off.

The filters are normally cooled by cooling means, otherwise the heat releasable light source may thermally deform or fuse the filters which are positioned close to the light source during exposure operation. Further, the filter position changing means can electrically change the filter position, so that the selected one of the filters can be brought into confrontation with the heat releasable light source. Even if the electric power supply is shut off for stopping the operation of the cooling means, the filters can be protected against the thermal deformation or fusing, since the urging means moves the filters to a position remote from the light source.

DETAILED DESCRIPTION OF THE PREFERRED EMBODIMENTS

A light irradiation apparatus according to one embodiment of the present invention will be described with reference to FIGS. 3(a) through 6.

Figure 3A:
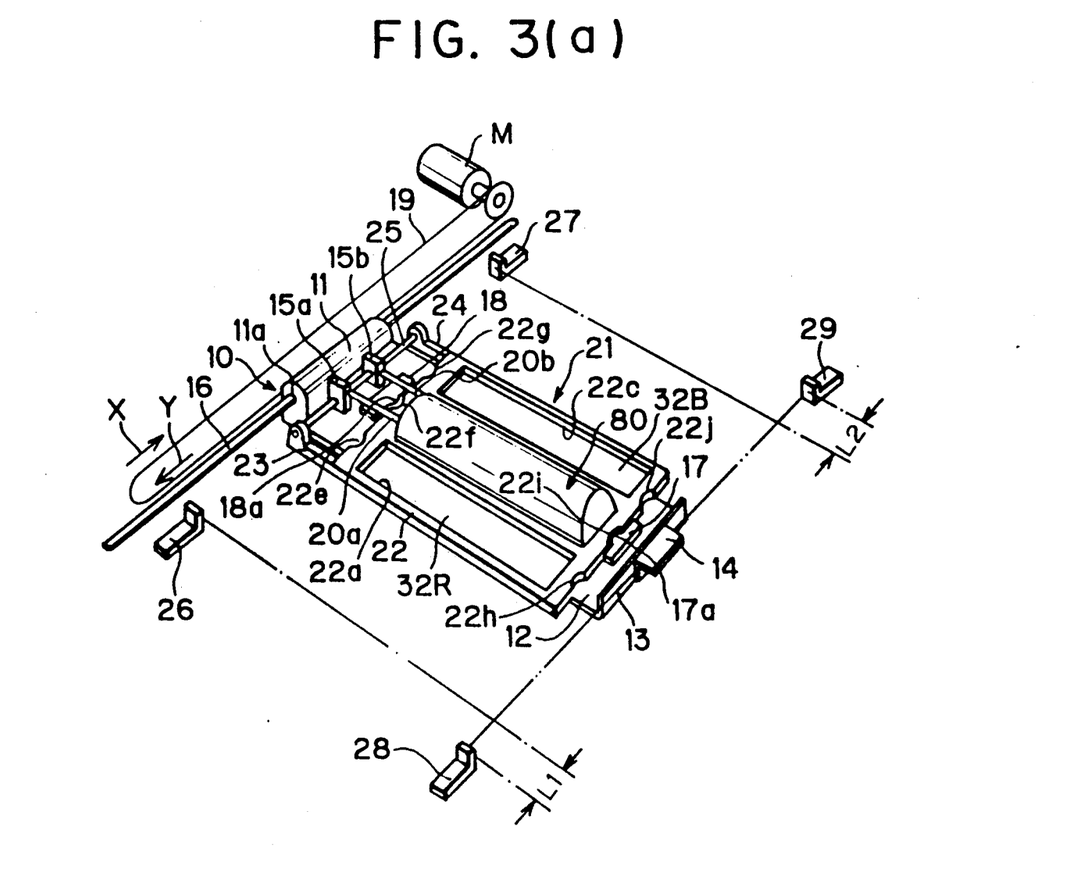
FIG. 3(a) is a perspective view showing a light irradiation device according to a first embodiment of this invention.

The light irradiation device generally includes a carriage 10 reciprocally movable at an exposure position, a slider frame 21 held on the carriage 10, stop pieces 26 through 29 positioned at four sides of the exposure position and a light source unit 80 provided on the slider frame 21.

The carriage 10 has a transversely extending carriage plate 12 which has one side end (left side in FIG. 3) provided with a support block 11. The support block 11 is formed with a bore 11a extending in moving direction of the carriage 10, and a guide rod 16 extends in the moving direction. The guide rod 16 extends through the bore 11a, so that the carriage plate 12 is slidably movable relative to the guide rod 16. A part of an endless wire member 19 is fixedly secured to the support block 11. The wire member 19 is driven by a drive motor M in normal and reverse directions X and Y so as to move the support block 11 in these directions.

The carriage 10 has an intermediate portion formed with a light irradiation window (not shown), and the light source unit 80 having a light source and a reflector (see FIG. 2) is positioned above the window. Therefore, the light emitted from the light source can pass through the window onto an object such as a mask member and a microcapsule sheet.

The carriage 10 has another side end (right side in FIG. 3) provided with an upstanding wall 13. Further, a slide bracket 14 having a L-shape cross-section is attached to the upstanding wall 13. The slide bracket 14 is adapted for sliding contact with a slide member (not shown).

A pair of post segments 15a and 15b extend upwardly from the one end portion of the cartridge plate 12 at a position adjacent the support block 11. Further, a pair of support shafts 20a and 20b extend in parallel with each other from the post segments 15a and 15b, respectively in a direction perpendicular to the guide rod 16 for fixedly supporting the light source unit 80 in cantilevered fashion.

The slider frame 21 is positioned above the cartridge plate 12. The slider frame 21 has a frame body 22 which defines three rectangular windows 22a, 22b, 22c with which a red filter 32R, a green filter 32G and a blue filter 32B are fitted. Further, a pair of arms 23,24 extend toward the guide rod 16 from one side (left side in FIG. 3) of the frame body 22. The arms 23 and 24 support a slide rod 25 therebetween, and the slide rod 25 extend through the post segments 15a and 15b and is provided slidable with respect thereto. The slide rod 25 extends in parallel with the guide rod 16. Accordingly, the slider frame 21 is slidable relative to the carriage 10 in a direction the same as the moving direction of the carriage 10.

At the one side edge of the frame body 22, a first set of three semicircular recesses 22e, 22f and 22g are formed. Each of these recesses is positioned at a position adjacent to each of the narrow sides of the filter windows 23a, 23b, 23c. Further, a detection means such as a periphery of the limit switch 18 is fixed on the one side portion of the carriage plate 12 for detecting a position of the slide frame 21. The limit switch 18 is provided with a resiliently deformable projection 18a which is selectively engageable with one of the recesses 22e, 22f, 22g. At every engagement of the of the projection 18a with one of the recesses 22e, 22f and 22g, the limit switch 18 is rendered ON.

On the other hand, at another side edge of the frame body 22 (right side in FIG. 3), a second set of three recesses 22h, 22i, and 22j are formed. Each of these recesses is positioned at a position adjacent to the second of the narrow sides of the periphery of the filter windows 22a, 22b, and 22c. Further, a positioning member 17 is attached to another side portion of the cartridge plate 12 for positioning the slide frame 21. For this, the positioning member 17 is provided with a protrusion 17a formed of a resilient material and engageable with one of the second set of the recesses 22h, 22i, 22j without any rattling. Accordingly, precise positioning of the slide frame 21 is achievable relative to the carriage 10.

The stop pieces 26 through 29 are classified into two groups. The first and second stop pieces 26 and 27 of a first group are positioned in alignment with the slide rod 25 and are abuttable on outer faces of the arms 23 and 24 for restricting reciprocal motion of the slider frame 21. (these stop pieces can be referred to as first and second slide frame stops 26 and 27). On the other hand, third and fourth stop pieces 28 and 29 of a second group are positioned in alignment with the upstanding wall 13 of the carriage plate 12 and are abuttable thereon for restricting reciprocal motion of the carriage 10 (these stop pieces can be referred to as a first and second carriage stops 28 and 29).

The first slide frame stop piece 26 and the first carriage stop piece 28 are positioned on the same side, and the second slide frame stop piece 27 and the second carriage stop pieced 29 are positioned on the opposite same side. However, the stop pieces 26 and 28 are not aligned with each other with respect to a direction perpendicular to the moving direction of the carriage 10 or the slide frame 21. Similarly, the stop pieces 27 and 29 are not aligned with each other with respect to a direction perpendicular to the moving direction of the carriage 10 or the slide frame 21.

Figure 3B:
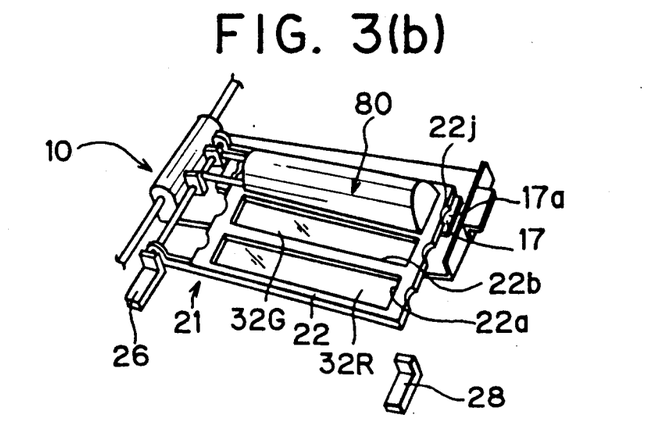
FIG. 3(b) through 3(d) are perspective views showing various positions of the light irradiation device according to the first embodiment of the present invention.
Figure 3C:
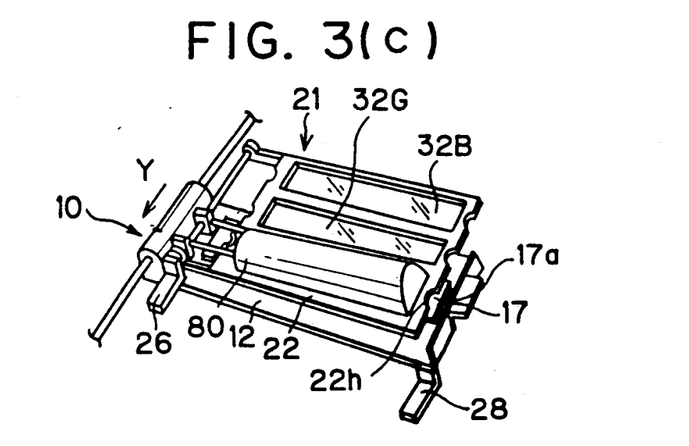

More specifically, the first carriage stop piece 28 is positioned more downstream relative to the first slide frame stop piece 26 by a distance L1 with respect to running direction of the carriage 10 in one direction (Y direction in FIG. 3(a)). Further, the second carriage stop piece 28 is positioned more downstream relative to the second slide frame stop piece 27 by a distance L2 with respect to running direction of the carriage 10 in the opposite direction (X direction in FIG. 3(a)). In FIG. 3(c), the protrusion 17a of the positioning member 17 is engaged with the first recess 22h of the frame body 22. In this case, by the provision of the distance L1, the first slide frame stop piece 26 is in abutment with the first arm 23 of the frame body 22, and the first carriage stop piece 28 is in abutment with the one end of the upstanding wall 13 when the carriage 10 is moved in the Y direction. Similarly, in FIG. 3(d), the protrusion 17a is engaged with the third recess 22j of the frame body 22. In this case, by the provision of the distance L2, the second slide frame stop piece 27 is in abutment with the second arm 24, and the second carriage stop piece 29 is in abutment with another end of the upstanding wall 13 when the carriage 10 is moved in the X direction.

Figure 5:
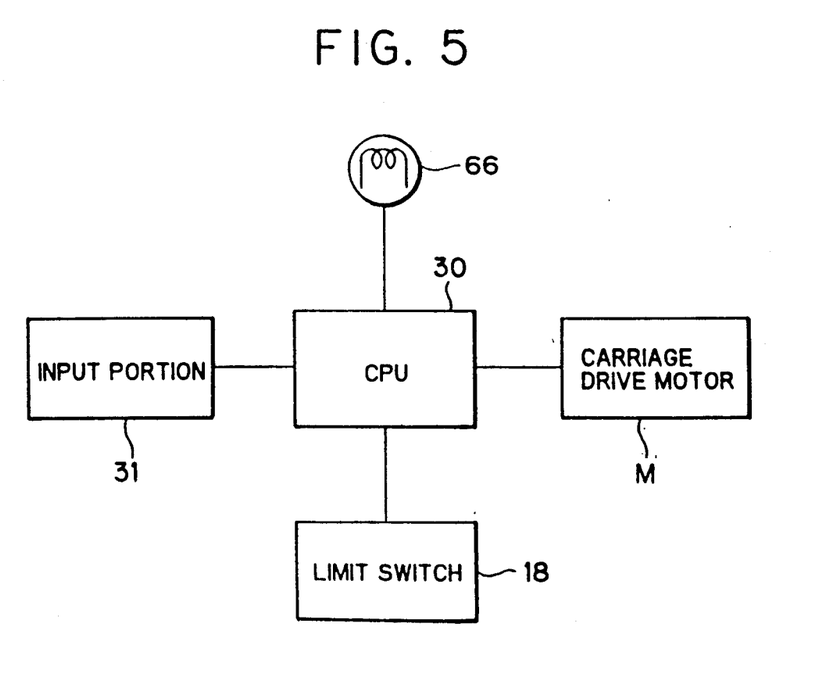
FIG. 5 is a block diagram showing a circuit arrangement for controlling the movement of the light irradiation device according to the first embodiment.

A control circuit is shown in FIG. 5. In FIG. 5 an input section 31, the limit switch 18, the light source 66 and the carriage drive motor M are connected to a CPU 30. In the input section 31, the initial phase of the light irradiation device is set. In the CPU 30, a determination is made as to a switching of the filters 32R, 32G, 32B in one cycle. That is, if all filters are successively used, the CPU 30 provides an end signal for copying. Further, ON numbers of the limit switch 18 (every engagement of the projection 18a with one of the recesses 22e, 22f, 22g) are countable in the CPU 30 for controlling the carriage drive motor M.

Figure 6:
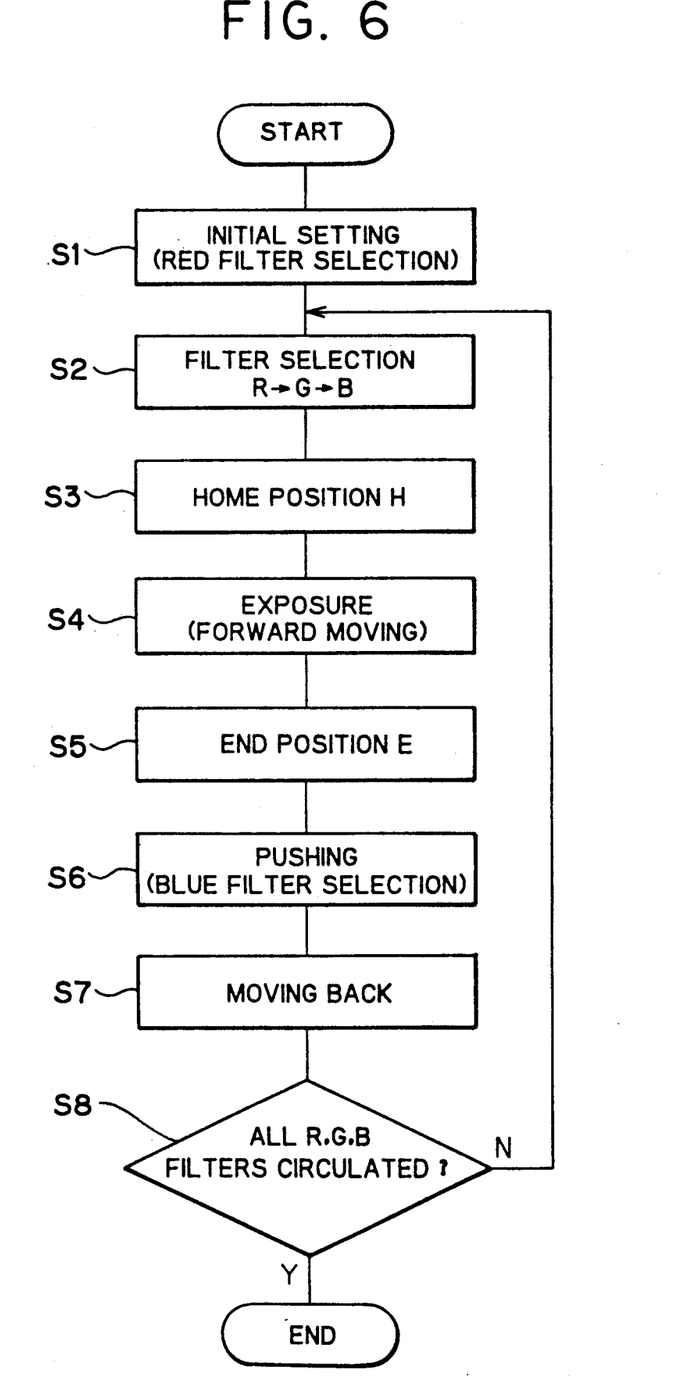
FIG. 6 is a flowchart for description of the operational sequence of the light irradiation device according to the first embodiment.

In operation, assuming that the filters are to be changed in the order of red, green and blue filters 32R, 32G and 32B, an initial setting is made in step S1 shown in FIG. 6 in order to use the red filter 12R for the first exposure operation. For the initial setting, the state shown in FIG. 3(c) is intended to be obtained, in which the first slide frame stop piece 26 abuts the one end of the frame body 12, and the first carriage stop piece 28 abuts the one end of the upstanding wall 13 of the carriage 10. In order to obtain the state shown in FIG. 3(c), starting from a state shown in FIG. 3(a), the carriage drive motor M is reversely rotated for moving the wire 19 in the Y direction so as to move the carriage 10 in the Y direction. Then, as shown in FIG. 3(b), the slide frame 22 is first brought into abutment with the first frame stop piece 26, since the slide frame 21 is mounted on the carriage 10. By this abutment, the slide frame 21 cannot be further moved in the Y direction, whereas the carriage 10 is still movable in the Y direction by the carriage drive motor M, since the slide rod 25 is slidable relative to the post segments 15a, 15b of the carriage 10. The movement of the carriage 10 is then stopped by the abutment of the upstanding wall 13 onto the first carriage stop piece 28. Accordingly, the slide frame 21 and the carriage 10 are positioned to their initial positions shown in FIG. 3(c). In this case, the protrusion 17a is engaged with the first recess 22h, so that the red filter 32R is aligned with the window (not shown) of the carriage plate 12 and with the light source 80.

Figures 4A, 4B, 4C, 4D:
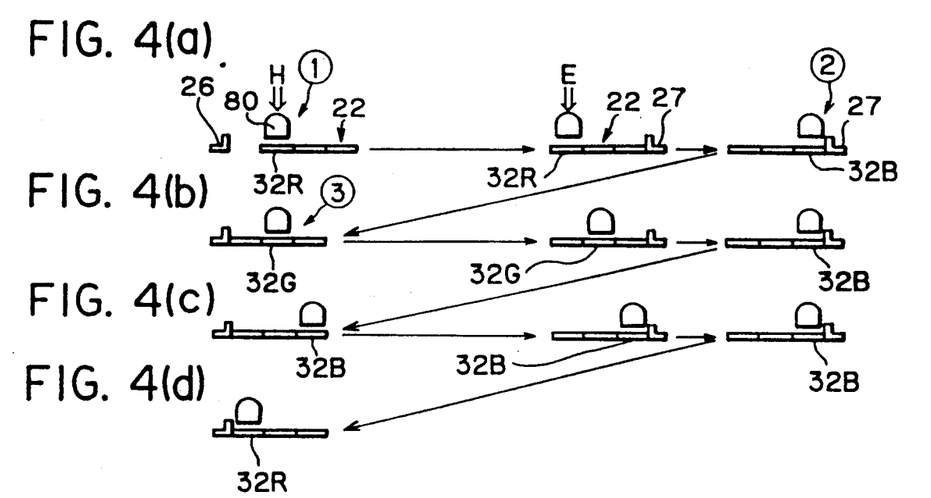
FIGS. 4(a) through 4(d) are schematic illustrations for description of the movement of a slide frame in connection with a carriage and stop pieces in the light irradiation device according to the first embodiment.

After the initial setting is completed, in step S2, the filter selection is performed. However, in this case, since the red filter 32R has already been set in the initial setting step S1, the carriage 10 is simply moved in the direction X by the normal rotation of the carriage drive motor M from the position shown in FIG. 3(c) while positional relationship between the carriage 10 and the slide frame 21 is maintained unchanged. Therefore, the irradiation device is moved to its home position H shown in FIG. 1 in step S3. This home position is also shown in FIG. 4(a)(1). Then in Step S4, exposure operation is performed in which the light irradiation device including the carriage 10, the slide frame 21 and the light source 80 are integrally moved in the X direction over the microcapsule sheet for emitting light thereto through the red filter 32R.

Figure 3D:
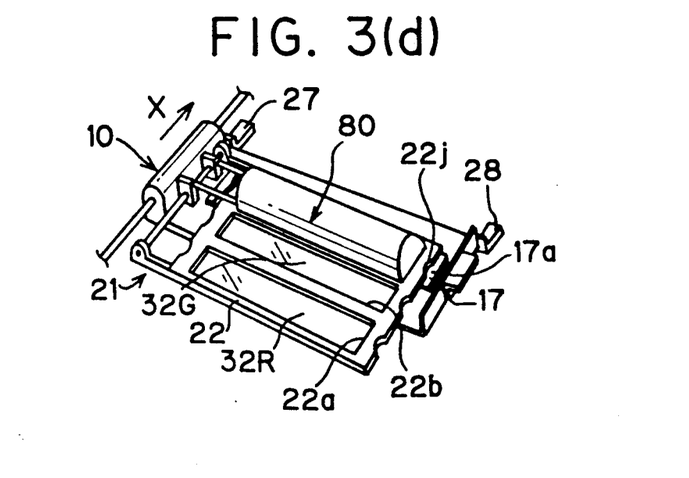

Then, in step S5, the light irradiation device reaches the end position E, and in step S6, the slide frame 21 is brought into abutment with the second frame stop piece 27, and thereafter, the carriage plate 12 is brought into abutment with the second carriage stop piece 29 to obtain the state shown in FIG. 3(d). In this case, the blue filter 32B is brought into alignment with the light source 80 and the window of the carriage window (not shown) as shown in FIG. 4(a)(2). The steps S2 through S6 pertains to a fundamental operation in using the red filter 32R.

Next, in step S7, the carriage drive motor M is reversely rotated for moving back the carriage 10 in the Y direction. In this case, a determination is made in the CPU 30 as to whether or not all three filters have been used for the exposures. In the present case, since only the red filter 32R has been used, the routine proceeds back to the step S2, where a second filter selection is executed. In this case, the side frame 21 is brought into abutment with the first frame stop piece 26 while the carriage 10 is further moved in the X direction, so that the protrusion 17a which has been engaged with the third recess 22j is disengaged therefrom, and becomes engaged with the second recess 22i. Accordingly, the green filter 32G is positioned in alignment with the window of the carriage plate 12 and the light source 80. Further, in this case, the limit switch 18 is also engaged with the intermediate recess 22f. Until this period, two ON signals are counted by the CPU 30, so that the reversal rotation of the carriage drive motor M is stopped. Accordingly, the light irradiation device has a position is shown in FIG. 4(b)(3).

The routine proceeds into the steps S3 through S6 so that green light exposure is achieved. In step S7, the carriage 10 is moved back and in step S8, determination is made as to whether or not three filters are used for the light exposures. Since the judgment is rendered NO, a blue filter selection is made in step S2. The routine again proceeds into steps S3 through S6 for the blue light exposure, and then, the light irradiation device is moved back to the position shown in FIG. 4(d). The routine further proceeds into Step S8 the determination is rendered YES, and therefore, the exposure operation is terminated. Thereafter, the conventional pressure developing and thermal fixing operations are carried out for obtaining a color output image.

The above described light irradiation device is used for an exposure device for exposing a photosensitive medium to various colored lights. However, the light irradiation device can also be available for an image reader in which an original is irradiated through filters successively changed with one another. According to the above illustrated embodiment, relative positional relationship between selected one of the filters and the light source is provided in a stabilized fashion because of the engagement of the projections with one of the recesses. Accordingly, no filter deviation occurs relative to the light source, to thereby perform high grade exposure operation.

Next, a light irradiation device according to a second embodiment of this invention will be described with reference to FIG. 7.

The light irradiation device 101 is provided with a movable carriage 104 slidably supported on a pair of guide rods 102, 102. On the movable carriage 104, an elongated light source such as a halogen lamp 106 is mounted. Apparently, the halogen lamp 106 is a heat releasable light source. Further, a reflector 108 is positioned below the halogen lamp 106 for directing the light upwardly.

The carriage 104 is formed with holes 104a through which a wire 148 extends. The wire 148 has one end fixed to an end face of the carriage 104 and another end fixed to an opposite end face thereof. A pair of pulleys 150 and 154 are provided for mounting the wire 148, and a motor 152 is coupled to one of the pulleys 154. Therefore, upon rotation of the motor 152, the carriage 104 is pulled by the wire 148 and is moved along the guide rods 102, 102.

A slide frame or a filter frame 112 is positioned above the halogen lamp 106 and the movable carriage 104. The filter frame 112 supports color resolution filters such as a red filter 110R, a green filter 110G and a blue filter 110B those being arranged in side by side relation in a horizontal plane. The filter frame or the slide frame 112 is slidably supported in a direction of an array of the filters 110R, 11G, 110B at a position above the movable carriage 104, similar to the slide frame 21 of the first embodiment. Further, a pair of racks 114 and 116 are provided to the filter frame 112. These racks extend in a sliding or moving direction of the filter frame 112. Further, the filter frame 112 is provided with a sensor (not shown) for detecting origins of different kinds of filters 110R, 110G, 110B.

A rotation shaft 122 is provided rotatable about its stationary axis, and a pair of pinion gears 118 and 120 are fixedly mounted on the rotation shaft 122. The pinion gears 118 and 120 are meshingly engageable with the pair of racks 114 and 116, so that these gears are simultaneously rotatable. Further, a gear wheel 124 is mounted on the rotation shaft 122, and an electromagnetic clutch 126 having a solenoid (not shown) is also mounted on the rotation shaft 122. If an electric power is supplied to the electromagnetic clutch 126 for energizing its solenoid, the gear wheel 124 is coupled to the rotation shaft 122, so that the rotation of the gear wheel 124 is transmitted to the rotation shaft 122 to drivingly rotate the pair of gears 118 and 120. On the other hand, if no electrical power is supplied to the electromagnetic solenoid 126, the gear wheel 124 is disengaged from the rotation shaft 122, so that the rotation shaft 122 is freely rotatable. A drive motor 128 is mounted on the movable carriage 104, and a motor shaft 130 extends through the wall of the carriage 104. A worm gear 132 is fixed to the motor shaft 130 to meshedly engaged with the gear wheel 124.

Figure 7:
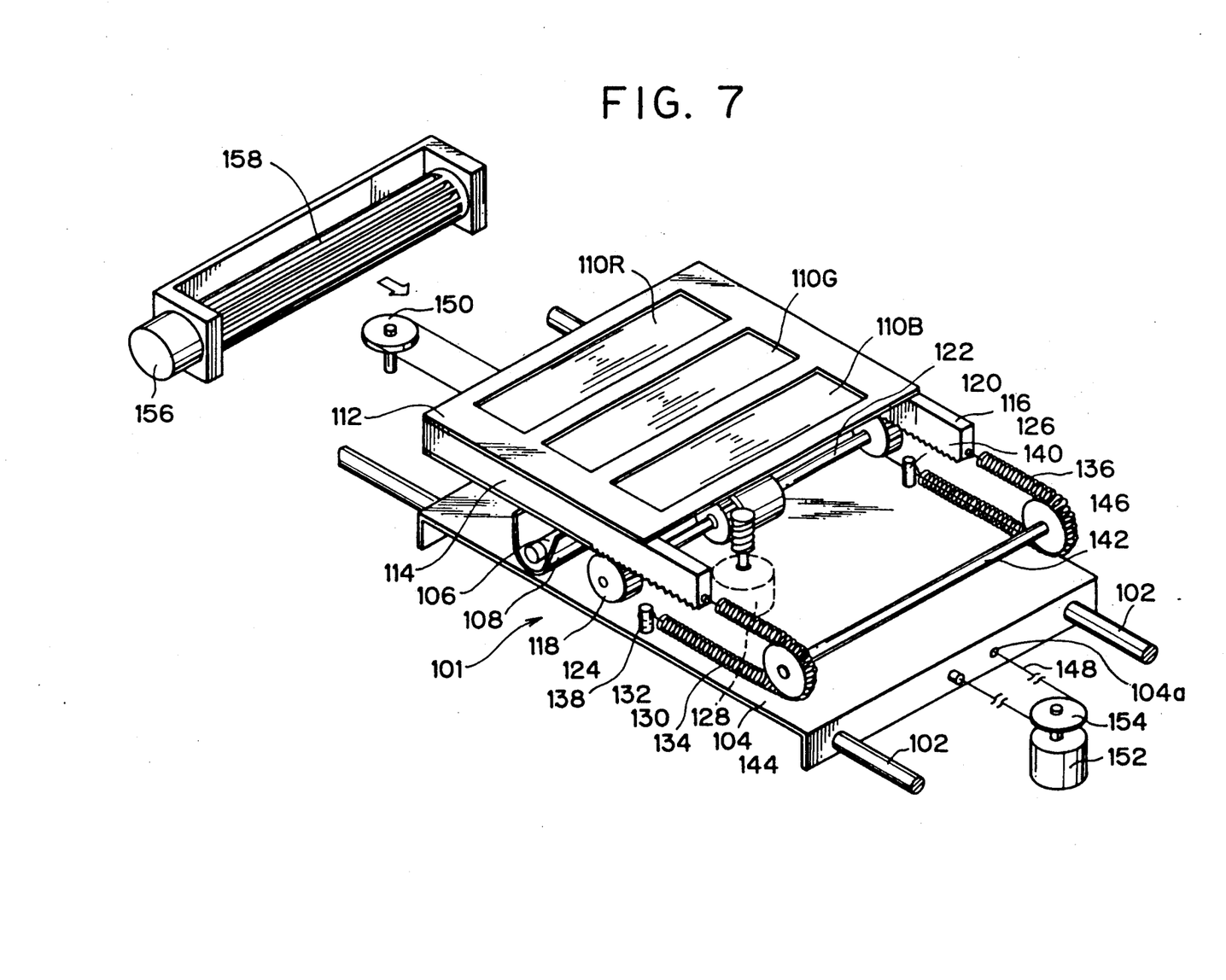
FIG. 7 is a perspective view showing a light irradiation device according to a second embodiment of this invention.

A pair of pins 138, 140 are implanted on the movable carriage 104, and further, a support shaft 142 is rotatably supported by the carriage 104 (In FIG. 7, bearing members for rotatably supporting the support shaft 142 are omitted for simplicity). A pair of pulleys 144 and 146 are fixedly mounted on the support shaft 142. A pair of coil springs 134 and 136 are provided. The coil spring 134 has one end connected to the pin 138 and another end connected to an end face of the rack 114 via the pulley 144. The other coil spring 136 has one end connected to the pin 140 and another end connected to an end face of the rack 116 via the pulley 146. Because of the biasing forces of the coil springs 134 and 136, the filter frame 112 is urged to be moved in a direction such that the filters 110R, 110G, 110B attached on the filter frame 112 is moved away from the light source 106 when the electromagnetic clutch 126 is at its non-operative state (no power supplied thereto).

Thus, a filter position changing means is provided by these filter frame 112, the racks 114, 116 the pinion gears 118, 120, the rotation shaft 122, the electromagnetic clutch 126, the gear wheel 124, the worm gear 132 and the drive motor 128. Further, urging means is provided by the coil springs 134, 136, the pulleys 144, 146 and the support shaft 142 for urging the filter frame 112 on one direction.

Further, a cooling fan 158 is provided which is driven by a motor 156 for supplying cooling air to the lamp 106, the reflector 108 and the filters 110R, 110G, 110B.

Figure 8:
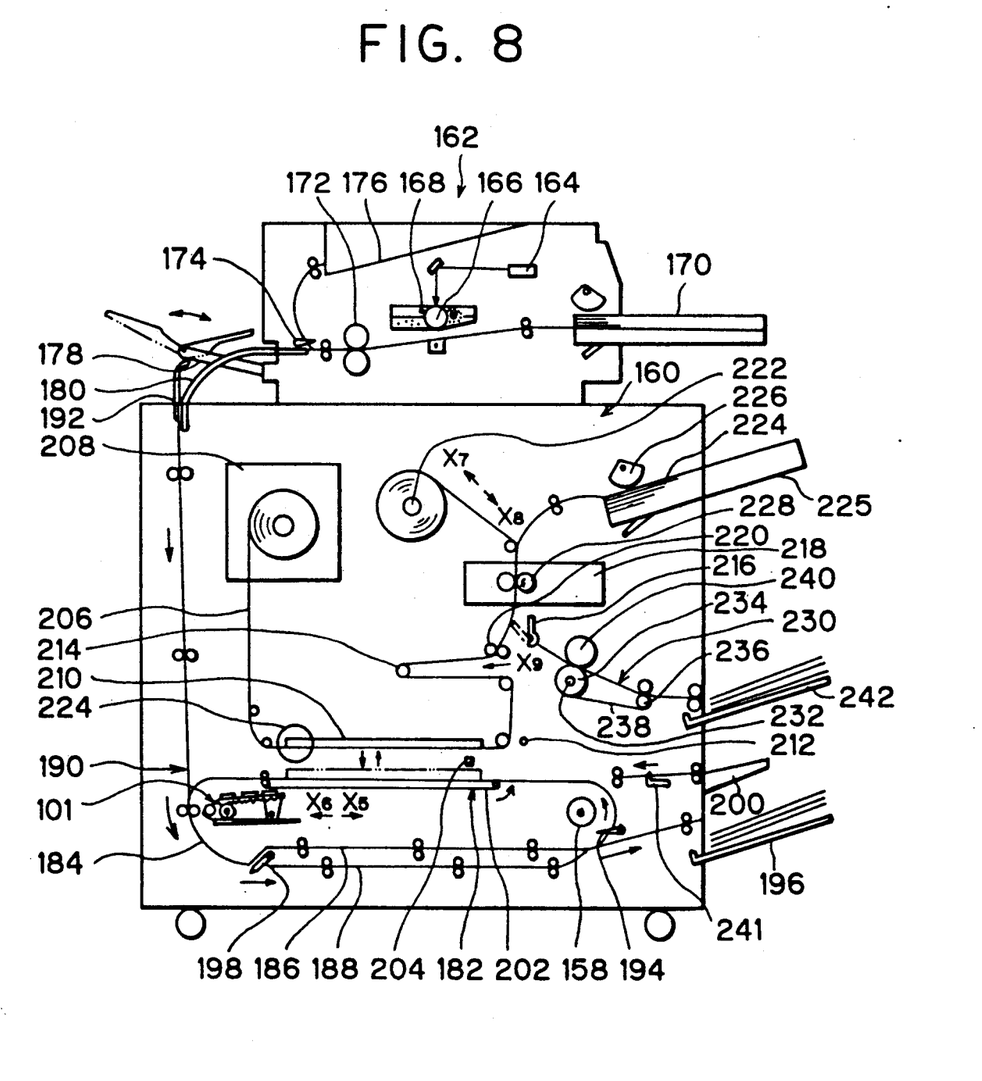
FIG. 8 is a schematic cross-sectional view showing an image recording apparatus incorporating the light irradiation device according to the second embodiment of this invention.

Next, will be described a color copying machine 160 which incorporates the light irradiation device 101 according to the second embodiment with reference to FIG. 8 in which the color copying machine 160 is coupled to a monochromatic laser printer 162. The monochromatic laser printer 162 is positioned on the color copying machine 160 and is adapted to produce an output image based on a data transmitted from a host computer (not shown). In the laser printer, 162, a polygon scanner 164 is rotatably provided for irradiating laser beam onto a chargeable photosensitive drum 166 for forming an electrostatic latent image thereon. Further, a developing unit 168 is provided for developing the latent image into a toner image. A sheet cassette 170 is provided for supplying a plain paper or an overhead projector sheet for transferring the toner image thereto, and the image is fixed by a fixing unit 172.

A sheet path change-over portion 174 is provided for discharging a monochromatic output image to a discharge tray 176. Alternatively, if color copying is intended, the output image is delivered to an another sheet tray 178, and is then delivered into the color copying machine 160. The another sheet tray 178 is pivotably provided as shown by a solid line and two dotted chain line in FIG. 8. When the discharge tray 178 has the solid line position, the sheet outputted from the laser printer 162 is delivered into the color copying machine 160. Three set of monochromatic sheets 180 serve as mask members 180R, 180G. 180B each containing specific color information. For example, in a red color mask member 180R, a toner image is formed as a light shielding image in order to allow only the cyan microcapsules to be photocured. Further, each of the mask members 180 is printed with a color identification mark and position adjustable marks. The color identification mark is indicative of specific color attendant to the mask member.

At a lower internal portion of the color copying machine 160, there are provided a mask member transferring unit 190 in which a mask position adjusting unit 182, a circulation guide 184 and two mask storing sections 186, 188 juxtaposed with each other are circularly arranged. Further, a gate 194 is positioned at a downstream side of the mask storing sections 186, 188 for selectively feeding the mask member to a mask discharge tray 196 or to the position adjusting unit 182. Furthermore, another gate 198 is positioned downstream of the circulation guide 184 and upstream of the two mask storing sections 186, 188 for selectively feeding the mask member 180 to either one of the upper or lower storing sections.

The mask member transferring unit 190 is connected to the discharge tray 178 of the monochromatic laser printer 162 through a guide member 192. Therefore, the mask member 189 produced at the printer 162 can be introduced into the mask member transferring unit 190. The mask member 180 passes through one of the upper and lower storing sections 186, 188, and reaches the gate 194. The mask member 180 is then discharged onto the mask discharge tray 196 or transferred to the mask position adjusting unit 182. Further, a manual insertion tray 200 is also provided for manually inserting the mask member 180 into the mask member transferring unit 190. In this case, the mask member 180 is produced by a mask producing unit other than the monochromatic laser printer. Furthermore, a gate 241 is provided for preventing the manually inserted mask member from being further fed toward the mask transferring unit 190 if the other mask member has already been set in the mask member transferring unit 190.

The mask position adjusting unit 182 includes an endless belt 202 formed of a transparent dielectric material such as PET. The endless belt 202 is mounted between pulleys one of which is connected to a drive source (not shown) for the belt drive circulation in a direction indicated by an arrow. A charger such as a corotron is provided for charging a surface of the endless belt 202, and therefore, the mask member 180 is electrostatically attracted to the belt 202. Further, a sensor 204 is positioned adjacent the endless belt 202 for setting the mask member 180 at a predetermined position by reading a positioning mark printed on the mask member 180.

At a position below the mask member position adjusting unit 182, the light irradiation device 101 shown in FIG. 7 is provided. The light irradiation device 101 is movable along the endless belt 202, and the light source 106 emits light upwardly toward the belt 202 through one of the filters 110R, 110G, 110B during the movement of the irradiation device 101.

A photosensitive recording medium 206 is adapted to pass along its sheet path as shown. The photosensitive recording medium 206 is disclosed for example in Japanese Patent Application Kokai No. 62-143044 in which a photo-curable resin containing a known photopolymerization initiator is used, and coated on a base substrate are microcapsules encapsulating therein cyan, magenta and yellow chromogenic materials and the photo-curable resins photocurable against specific light wavelengths of red, green and blue lights.

The photosensitive recording medium 206 is accommodated in a sheet cartridge 208 in a rolled fashion for avoiding photosensing, and an exposure stand 210 is positioned above the endless belt 202. The sheet cartridge 208 is provided with a back-tension application means (not shown) for normally pulling the elongated photosensitive recording medium 206 toward the sheet cartridge space, and reversal winding means for winding the medium 206 in order to absorb the sheet slack which may be generated at a terminal phase of the exposure operation.

The photosensitive recording medium 206 drawn out of the sheet cartridge 208 passes through a space defined between the exposure stand 210 and the endless belt 182. Along the sheet path are a stationary roller 212, a slack absorbing unit 214, a movable guide 216, a pressure developing unit 218 having a pressure roller 228, a drive roller 220 and a takeup roller 222. Further, a cam means 224 is provided for moving the exposure stand 210 toward the end less belt 202 for providing an intimate contact of the photosensitive recording medium at the exposure stand 210 with the mask member 180 during exposure operation. The stationary roller 212 is adapted to nippingly hold the light exposed photosensitive recording medium 206 during pressure developing operation at the pressure developing unit 218. Further, the slack absorbing unit 214 is adapted to avoid slack in the photosensitive recording medium 206 during the pressure developing operation. Furthermore, the drive roller 220 is adapted to feed the photosensitive recording medium 206 at a constant velocity.

A stack of cut developer sheets 224 is accommodated in a developer sheet cassette 225. The developer sheet 224 is disclosed for example in Japanese Patent Application Kokai No. 58-88739 in which a developer material is coated on a base substrate. Further, a binder polymer is formed on the base substrate for fixing the developer material to the base substrate. The binder polymer is fusable for providing a gloss output image in the developer sheet. In the illustrated embodiment, the developer material layer is faced downwardly in the sheet cassette 225. A sheet feed means 226 such as a sector roller is connected to a drive means (not shown) so that the feed means is intermittently driven for feeding each one of the developer sheet 224 toward the pressure developing unit 218. The developer sheet 224 is superposed with the light exposed portion of the photosensitive recording medium 206, and are pressed by the pressure roller 228 of the pressure developing unit 218. Accordingly, a latent image formed on the photosensitive recording medium 206 is visualized on the developer medium 224.

A thermal fixing unit 230 is provided for gloss treatment on the output image formed on the developer sheet 224. The fixing unit 230 includes a heat roller 234 having a heater 232, an auxiliary roller 236, an endless belt 238 mounted between the heat roller 234 and the auxiliary roller 236, and a press roller 240 in pressure contact with the heat roller 234 through the endless belt 238. The developer sheet 206 fed from the pressure developing unit 218 is introduced into the fixing unit 230 through the movable guide 216, and gloss image processing is carried out in the fixing unit 230. The developer sheet 206 is then discharged onto a sheet tray 242.

Operation of the image recording apparatus shown in FIG. 8 will be described. The monochromatic laser printer 162 produces a first mask member 180R for red color information (hereinafter simply referred to as a red color mask member 180R). In the red color mask member 180R, a toner image is formed as a light shielding image in order to allow only the cyan microcapsules to be photocured.

In this case, the discharge tray 178 of the monochromatic laser printer 162 has the solid line position, so that the red color mask member 180R can be introduced into the mask transferring unit 190 by way of the guide member 192. Further, in this case, if determination is made that no mask member is positioned at the mask position adjusting unit 182 by the sensor 204, the gate 194 is moved to allow the red color mask member 180R to be delivered toward the mask position adjusting unit 182.

Next, at the mask position adjusting unit 182, the mask member 180R is electrostatically attracted to the belt 202, and is delivered to an exposure position where fine positional adjustment is carried by reading the positioning mark with the sensor 204 and by driving the drive source not shown for moving the belt 202 in response to the sensor signal.

Then, the photosensitive recording medium 206 is held by the stationary roller 212, and the cam means is rotated by a predetermined angle by the cam drive source (not shown), so that the exposure stand 210 is moved downwardly to permit the photosensitive recording medium 206 to be brought into contact with the mask member 180R mounted on the belt 202.

Upon intimate contact of the photosensitive recording medium 206 with the mask position adjusting unit i.e., the endless belt 202, the light source 106 is turned ON, and the red light is irradiated onto the photosensitive medium through the red filter 110R which has been positioned above the light source 106. In this exposure, the movable carriage 104 is moved in a direction X5 by the rotation of the drive motor 152 through the wire 148 for light scanning. Upon completion of the scanning, the light source 106 is turned OFF, and the movable carriage 104 is moved backwardly in a direction X6 by the reversal rotation of the drive motor 152. In this case, the motor 128 of the light irradiation device is driven, so that the worm gear 132 is rotated to rotate the pinion gears 118, 120 through the gear wheel 124, the electromagnetic clutch 126, ,and the shaft 122. By the rotations of the pinion gears 118 and 120, the racks 114, 116 are moved for moving the filter frame 112 with respect to the movable carriage 104. Accordingly, the green filter 110G is brought into confrontation with the light source 106 for the next green light scanning.

In this filter position change, the sensor 204 detects the positioning mark as well as the color identification mark those printed on the mask member. Further, the sensor (not shown) of the filter frame 112 detects the origin of the filters. Therefore, if the color of the mask member indicated by the color identification mark does not correspond to an exact location of the corresponding filter having the same color, the filter frame is moved relative to the carriage 104, so that the correct filter associated with the detected color of the mask member can be brought into the correct position on the carriage 104.

During the reverse movement of the carriage 104 in the X6 direction, the exposure stand 210 is moved upwardly by the rotation of the cam means 224, so that the photosensitive recording medium 206 is moved away from the mask position adjusting unit 182 and from the red mask member 180R. In this instance, a sheet slack of the medium 206 is generated. However, since the back-tension is applied to the recording medium 206 at the sheet cartridge 208, the slackened area is moved back to the sheet cartridge 208. (incidentally, in case of the downward movement of the exposure stand 210, the photosensitive recording medium 206 is drawn out of the sheet cartridge 208 by a length corresponding to the downwardly moving distance of the stand 210 with overcoming the applied back-tension.)

Upon completion of the red light exposure operation and acknowledgement of the ascent position of the exposure stand 210, The belt 202 of the mask position adjusting unit is driven, so that the red color mask member 180R is fed along the circulation guide 184 and reaches the upper mask storing section 186 through the gate 198. Thereafter, the green color mask member 180G produced at the monochromatic laser printer 162 is introduced into the mask position adjusting unit 182 through the guide member 192 and the gate 194.

Then, the exposure operation with green light is performed, in the same manner as the red light exposure operation. That is, the green mask member 180G undergoes position adjustment with respect to the photosensitive recording medium 206, and the exposure stand 210 moved downwardly to let the photosensitive recording medium 206 be brought into intimate contact with the green mask member 180G on the positioning belt 202. Thereafter, the light source 106 is turned ON, and the green light scanning is performed with using the green filter 180G and with moving the carriage 104 in the X5 direction. After the green light exposure, the exposure stand 210 is elevated, and the green mask member 180G is introduced into the lower mask storing section 188 by switching the position of the the gate 198. Further, the carriage 104 is moved back to the original position, and at the same time, the filter frame 112 is moved by the rotation of the drive motor 128 to bring the blue filter 110B into a position above the light source 106.

Similarly, the blue mask member 180B produced at the monochromatic laser printer 162 is transferred by the mask transferring unit 190 to the mask position adjusting unit 182, and undergoes position adjustment thereby. Then blue light exposure is carried out in a manner the same as above. By the three with exposures with using three kinds of mask members and a corresponding three kinds of filters, a color latent image is formed on an identical zone of the photosensitive recording medium 206.

Next, the exposure stand 210 is moved upwardly, and simultaneously, the fixed roller 212 is moved away from the photosensitive recording medium 206 so as to take up the latter in X7 direction. In this takeup operation, the latent image section passes through the pressure developing unit 218. In this case, the movable guide member 216 is positioned at its solid line positions shown in FIG. 8. Further, the pressure rollers 228 of the pressure developing unit 218 are moved away from each other. Therefore, microcapsules coated on the recording medium 206 may not be damaged during the winding operation. The rotation of the drive roller 220 is stopped when the trailing end of the latent image zone of the photosensitive recording medium 206 has just passed through the pressure rollers 228.

In synchronism with the feed movement of the photosensitive recording medium 206, the developer sheet 224 is supplied by means of the feed roller 226 from the sheet cassette 225. The developer sheet feeding is stopped when the leading edge of the sheet 224 is brought into alignment with the trailing end of the latent image section. Then, the pressure rollers 228 are drivingly rotated in a direction indicated by an arrow in FIG. 8, and at the same time, the fixed roller 212 again nips the photosensitive recording medium 206. Therefore, the photosensitive recording medium 206 and the developer sheet 224 are superposedly pressed together and fed in a direction indicated by an arrow X8. During this travel, the unexposed microcapsules are ruptured by the pressure rollers, so that a visible color image corresponding to the latent image is formed on the developer sheet 224.

Because of the rotation of the pressure rollers 228 in the arrowed direction, the sheet slack is generated. However, the sheet slack absorbing unit 214 is moved in a direction indicated by an arrow X9 for absorbing the sheet slack. During this movement, the movable guide 216 is moved to the broken line position by a drive source (not shown). Accordingly, the developer sheet 224 can be separated from the photosensitive recording medium 206, and the developer sheet 224 is delivered to the thermal fixing unit 230.

In the thermal fixing unit 230, the developer sheet 224 is nipped between the heat roller 234 and the press roller 240 through the endless belt 238, and therefore, heat from the heater 232 is applied to the developer sheet 224 for promoting coloring. At the same time, the binder polymer of the developer sheet 224 is thermally fused, so that the imaging surface of the developer sheet 224 has a smoothness corresponding to a smoothness of the endless belt 238. Accordingly, a glossy output image is obtainable. The developer sheet 224 is then discharged to the discharge tray 242.

In the above described sequential pressure developing and thermal fixing operations, the photosensitive recording medium 206 is held by the fixed roller 212. Therefore, exposure operation, or any operations, done upstream of the exposure stand 210 is not affected by a tension which may be applied to the recording medium 206 during the pressure developing and the thermal fixing operations. Accordingly, it is possible to perform another exposure operation while the pressure developing and thermal fixing operations are carried out.

Further, if a plurality of identical color images are to be obtained by using the same set of the mask members, the red mask member 180R stored in the storing section 186 is again fed to the mask position adjusting unit 182 through the gate 194 of the mask member transferring unit 190 so as to perform red light exposure operation the same as described above. The same is true with respect to the mask members 180G and 180B. The mask member transferring unit 190 thus performs desired numbers of recirculation of the mask members. After the desired numbers of exposures are carried out, the gate 194 is pivotally moved for allowing the mask members to be fed to the discharge tray 196.

In the light irradiation device according to the second embodiment, in case of the power supply, the cooling fan 158 is rotatable for mainly cooling the light source and the filters, and electromagnetic clutch 126 is actuated for coupling the rotation shaft 122 to the gear wheel 124. Therefore, the pinion gears 118 and 120 are not freely rotatable about the axis of the rotation shaft 122 since a self-locking function is attainable because of the meshing engagement between the worm gear 132 and the wheel gear 124. That is, the pinion gears 118 and 120 are only rotatable when the drive motor 128 is energized.

However, if a main power source is inadvertently shut off, or if the electrical power supply is suspended due to any malfunction of the image recording apparatus in a state where the movable carriage 104 is moved in X5 direction and the light source 106 is turned ON with operation of the cooling fan 158, the rotation of the cooling fan 158 is stopped and electrical power supply to the electromagnetic clutch 126 is also stopped. In accordance with the electrical shut off to the clutch 126, the coupling between the gear wheel 124 and the shaft 122 is released. Consequently, the rotation shaft 120 becomes freely rotatable about its axis, so that the pinion gears 118 and 120 those integral with the rotation shaft 122 are also freely rotatable. As a result, the coil springs 134, 135 of the biasing means urge the filter frame 112 in the X6 direction, so that the filters 110R, 110G, 110B mounted on the filter frame 112 can be moved away from the light source 106.

Since the light source 106 and the reflector 108 accumulate therein heat even after the shut of the electrical power supply and rotation of the cooling fan 158 is also stopped due to the electrical shut off. The ambient air temperature may be elevated. However, in the illustrated embodiment, since the filters 110R, 110G, 110B can be moved away from the light source 106 and the reflector 108 even after the electrical shut off, any damage to the filters by the elevated ambient temperature such as thermal deformation or fusion can be avoided. Thus, in the illustrated embodiment, the filters 110G, 110G, 110B can be formed of a material having low heat resistivity, such as an inexpensive polyethylene terephthalate.

Incidentally, in the second embodiment, the electromagnetic clutch 126 is employed, and worm gear 132 and the gear wheel 124 are used for transmitting rotation of the motor to the pinion gears. However, a spur gear is also available for the power transmission. In the latter case, however, since no self-locking function is provided, the electromagnetic clutch is not necessarily required. For example, the large biasing force is provided in the coil springs 134 and 136 so as to forcibly rotate the drive motor in a reverse direction in order to move the filters at position remote from the light source.

While the invention has been described in detail and with reference to specific embodiments thereof, it would be apparent to those skilled in the art that various changes and modifications can be made therein without departing from the spirit and scope of the invention.

What is claimed is:

1. A light irradiation device having a light source and a plurality of filters for providing a plurality of kinds of colored lights onto an object, comprising:
    a carriage reciprocally movable over the object in one and opposite directions, the carriage having the light source mounted thereon in a stationary position, the carriage being provided with a carriage plate having a leading end and a trailing end;
    a slide frame mounted on the carriage plate and slidably movable relative to the carriage plate in opposite directions parallel to the moving direction of the carriage, the slide frame being attached with the plurality of filters arranged side by side in a horizontal plane and having a leading end and a trailing end;
    a positioning means for positioning the position of the slide frame relative to the carriage plate;
    a first set of stop means abuttable on the leading end and trailing end of the slide frame for restricting the movement of the slide frame in either direction of movement;
    a second set of stop means abuttable on the leading and trailing ends of the carriage plate for restricting the movement of the carriage plate in either direction of movement; and
    drive means connected to the carriage plate for moving the carriage plate in either direction of movement, the first and second set of stop means being positioned differently from each other for changing positional relationships between the carriage plate and the slide frame, whereby selected one of the filters is positioned in confrontation with the light source.

2. The light irradiation device as claimed in claim 1, wherein the positioning means comprises a protrusion fixedly mounted on the carriage plate, the slide frame having first and second side edges in parallel with the moving direction thereof, and a plurality of first recesses being formed on the first side edge, the protrusion being selectively engageable with one of the recesses for positioning one of the filters in confrontation with the light source.

3. The light irradiation device as claimed in claim 2, further comprising a position detector mounted on the cartridge plate for detecting a position of the slide frame relative to the cartridge plate, 4. The light irradiation device as claimed in claim 3, wherein the second side edge of the slide frame is formed with a plurality of second recesses, the position detector being engageable with one of the second recesses 5. A light irradiation device having a light source and a plurality of filters for providing a plurality of kinds of colored lights onto an object, comprising:
- a carriage reciprocally movable over the object in one and opposite directions, the carriage having the light source mounted thereon in a stationary position;
- a slide frame mounted on the carriage and slidably movable relative to the carriage in opposite directions parallel to the moving direction of the carriage, the slide frame being attached with the plurality of filters arranged side by side in a horizontal plane;
- filter position changing means connected to the slide frame for positioning a selected one of the filters in confrontation with the light source, the changing means being electrically actuatable;
- drive means connected to the carriage for moving the carriage in either direction of movement; and
- biasing means connected to the slide frame for mechanically urging the slide frame in a direction so as to move the filters to a position remote from the light source when the electrical power supply to the filter position changing means is shut off.

6. The light irradiation device as claimed in claim 5, wherein the filter position changing means comprises:
- at least one rack integrally provided at the slide frame;
- a rotation shaft rotatable about its stationary axis;
- at least one pinion gear fixedly mounted on the rotation shaft and meshedly engageable with the rack;
- a gear wheel supported on the rotation shaft;
- an electromagnetic clutch mounted on the rotation shaft, the electromagnetic clutch coupling the gear wheel to the rotation shaft while electrical power is supplied to the clutch and decoupling the gear wheel from the rotation shaft when electrical power is shut off; and
- a drive source engageable with the gear wheel for rotating the pinion gear.

7. The light irradiation device as claimed in claim 6, wherein the biasing means comprises at least one coil spring having one end connected to the slide frame and another end connected to the carriage.

* * * * *